United States Patent

Schmidt

[15] 3,652,878

[45] Mar. 28, 1972

[54] ELECTROMAGNETICALLY CONTROLLED RELAY APPARATUS HAVING NO MECHANICAL CONTACT MEMBERS

[72] Inventor: Karl Schmidt, Achern, Germany

[73] Assignee: GEHAP Gesellschaft fuer Handel und Patentverwertung mbH & Co.

[22] Filed: Mar. 11, 1969

[21] Appl. No.: 806,240

[30] Foreign Application Priority Data

| | | |
|---|---|---|
| Mar. 18, 1968 | Germany | P 15 62 171.3 |
| Sept. 18, 1968 | Germany | P 17 62 894.3 |
| Oct. 31, 1968 | Germany | P 18 06 382.6 |

[52] U.S. Cl. ..... 307/309, 336/110, 328/5, 317/148.5

[51] Int. Cl. ..... G05d 1/00

[58] Field of Search ..... 307/309, 254; 328/1, 5; 338/32; 336/110

[56] References Cited

UNITED STATES PATENTS

| | | | |
|---|---|---|---|
| 2,752,553 | 6/1956 | Dunlap | 307/309 |
| 3,097,296 | 7/1963 | Chasmar et al. | 307/309 |
| 3,195,043 | 7/1965 | Burig et al. | 307/309 |
| 3,210,677 | 10/1965 | Lin et al. | 307/251 |
| 3,230,434 | 1/1966 | Bauerlein | 307/309 |
| 3,267,404 | 8/1966 | Hieronymus | 307/309 |
| 3,305,765 | 2/1967 | Rittner | 307/309 |
| 3,172,032 | 3/1965 | Hunt | 338/32 |
| 3,366,909 | 1/1968 | Hini et al. | 338/32 |
| 3,471,722 | 10/1969 | Hini et al. | 338/32 |
| 3,297,009 | 1/1967 | Sasaki et al. | 307/309 |
| 3,535,626 | 10/1970 | Uemura et al. | 307/309 |

OTHER PUBLICATIONS

" Contactless Current Switching Devices" by F. J. McKendry, IBM Technical Disclosure, Vol. 2, No. 5, Feb. 1960, p. 83

*Primary Examiner*—Donald D. Forrer
*Assistant Examiner*—Harold A. Dixon
*Attorney*—Otto John Munz

[57] ABSTRACT

A contactless relay with an electromagnetic control circuit and with either one or several electronic switching circuits, comprising within the range of the magnetic field of at least one relay coil of the electromagnetic control circuit a relay mechanism without any mechanical contact elements which is controllable by means of the magnetic field and in operative engagement with at least one controllable semiconductor system.

6 Claims, 13 Drawing Figures

Inventor:
KARL SCHMIDT
BY Otto John Munz
ATTORNEY

Inventor:
KARL SCHMIDT
BY Otto John Munz
ATTORNEY

Fig. 5
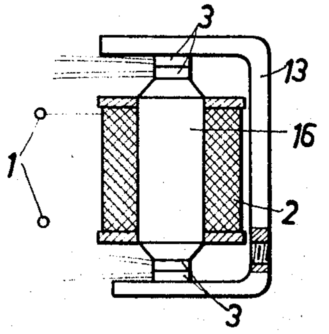
Fig. 6
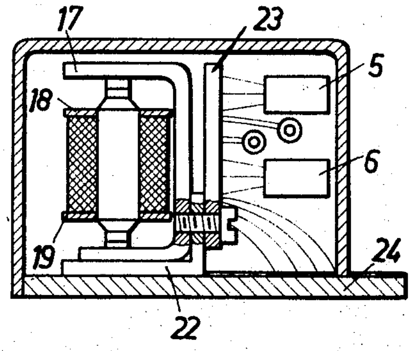
Fig. 7
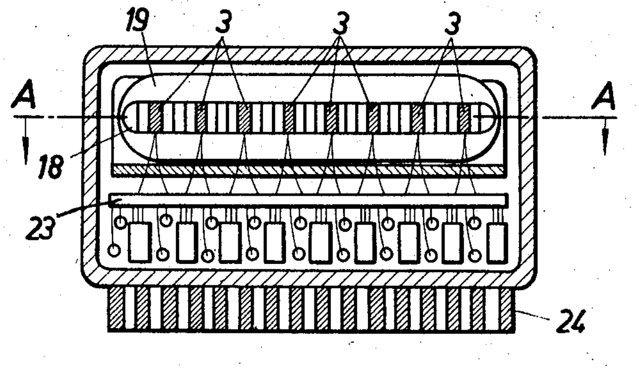
Fig. 8 (A-A)
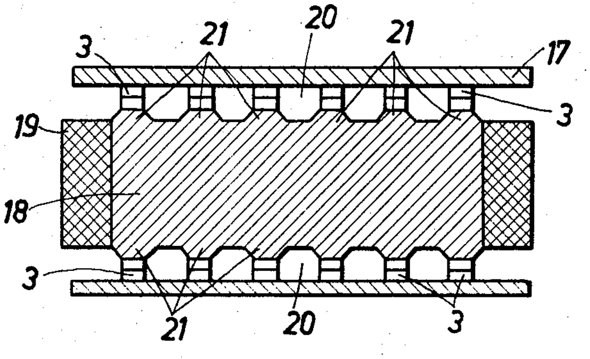
Inventor:
KARL SCHMIDT
BY Otto John Munz
ATTORNEY Inventor:
KARL SCHMIDT
BY Otto John Munz
ATTORNEY Inventor:
KARL SCHMIDT
BY Otto John Munz
ATTORNEY

INVENTOR:

KARL SCHMIDT

BY Otto John Munn,

ATTORNEY

ELECTROMAGNETICALLY CONTROLLED RELAY APPARATUS HAVING NO MECHANICAL CONTACT MEMBERS

FIELD OF THE INVENTION

The present invention relates to a contactless relay with an electromagnetic control circuit and an electronic switching circuit or network.

DESCRIPTION OF THE PRIOR ART

The relays known in the art to date consist essentially of a relay coil with a ferromagnetic core and an armature, wherein one part of the armature is movable and moves a contact or a set of contacts by virtue of the electromagnetic forces.

SUMMARY OF THE INVENTION

It is the object of the present invention to propose a relay which has no mechanical contacts but comprises an electromagnetic control circuit and either one or several switching circuits or networks being electrically isolated therefrom.

In order that this object be obtained the present invention proposes a contactless relay with an electromagnetic control circuit and with an electronic switching circuit which is characterized by the fact that a device is disposed within the range of the magnetic field of the relay coil of the electromagnetic control circuit which is controllable by means of the magnetic field and in operative engagement with a controllable semiconductor arrangement or system. A controllable device of this type may consist, for example, of a magnetic field-dependent resistance, i.e. a so-called field plate, or for instance of a Hall generator being positioned in the range of the magnetic field of the relay coil.

In accordance with a preferred embodiment of the circuit proposed by the present invention, the device being responsive to the magnetic field, particularly the magnetic field-dependent resistance, may be connected by way of a series resistance to a voltage source and joined to an amplifying and switching transistor whose output is connected to a terminal or contact for the current source and the load impedance.

The device which is controllable by means of the magnetic field may further be disposed within the range of a relay coil in which a permanent magnet is provided for setting a premagnetization field. In this manner the operating point of the circuit or network can be shifted at will by means of the transistor arrangement on the characteristic curve.

Several advantages are afforded by virtue of the contactless relay proposed by the present invention. On the one hand, it eliminates all of the disadvantages which arise with the use of mechanical contacts. On the other hand, the contactless relay according to the present invention has a considerably higher switching frequency since no mechanical parts have to be moved. The control circuit proper is therein electrically isolated from the switching circuit, as is the case in the conventional type relay. The necessary voltage source for the switching circuit has no disadvantageous effects since a special voltage is required in any event in a relay for producing the magnetic field. The relay according to the present invention may also be constructed in a simple manner in a way such that it can be readily inserted into already known relay housings, in which case the electronic switching device is used instead of the contact set or bank of contacts. This electronic switching device may be composed of individual structural elements, for example mounted on a printed circuit board. It is also possible, however, to use for this purpose a special integrated switching circuit whose dimensions are very small so that the entire switching circuit will occupy only a limited amount of space, whereby the relay can be made relatively small.

According to a further embodiment of the present invention, a multiple connection and a change-over operation may also be effected with the relay proposed by the invention. For this purpose, several contactless devices which are controllable by means of the magnetic field are disposed in either one or several air gaps and these devices are in operative engagement with controllable semiconductor systems. As a result it is possible to construct relays having as many connecting, disconnecting or change-over devices as is desired without mechanical contacts being required therefor. For example, a simple contactless change-over or switching relay may be obtained by providing between the core of a relay coil and the U-shaped ferromagnetic yoke one air gap each at both connecting ends, either one or several magnetic field-dependent resistances being disposed in one air gap and either one or several magnetic field-dependent resistances together with a permanent magnet being disposed in the other air gap, and the magnetic field-dependent resistances disposed in the air gaps being in operative engagement with either one each or several controllable semiconductor systems.

Thus a simple change-over or switching relay, for example, may be provided and constructed by disposing in one air gap only one magnetic field-dependent resistance and in the other air gap one magnetic field-dependent resistance together with a small permanent magnet. Both magnetic field-dependent resistances are in operative engagement with a transistor amplifying and switching device being connected to the common voltage source, whereby the change-over of the connected load is brought about between the two outputs of the switching transistors, depending upon the direction which the current surge takes through the relay coil.

In order to form several air gaps, a flat elongated core may be disposed for example in an elongated coil, which core includes at the upper and lower sides symmetrically-positioned grooves or recesses for producing pole faces being enclosed by a U-shaped ferromagnetic profile piece or member with air gaps being formed, and either one or several magnetic field-dependent resistances are disposed respectively between the air gaps. It is understood that also several individual coils may be positioned in the U-shaped profile piece or member and the cores thereof form between the flanges air gaps in which are accommodated the magnetic field-dependent resistances and, if desired, the permanent magnets.

The corresponding switching transistor arrangement may be disposed on a switching plate being secured thereto which is either connected with a plug board provided in a printed circuit, or terminates into such a plug board. Lastly, it is also possible to connect the magnetic field-dependent resistances with the switching transistor arrangements in the form of integrated circuits.

BRIEF DESCRIPTION OF THE DRAWINGS

The present invention will be further described hereinafter on the basis of several preferred embodiments and taken in connection with the accompanying drawings, wherein

FIG. 5 is a cross-sectional view through a contactless relay with two air gaps and several magnetic field-dependent resistances;

FIG. 6 is a side view of a partial cross section of a contactless multiple relay;

FIG. 7 is a top plan view and

FIG. 8 is a longitudinal cross-sectional view taken along line A—A of FIG. 7 of the contactless multiple relay according to FIG. 6;

Figure 1:
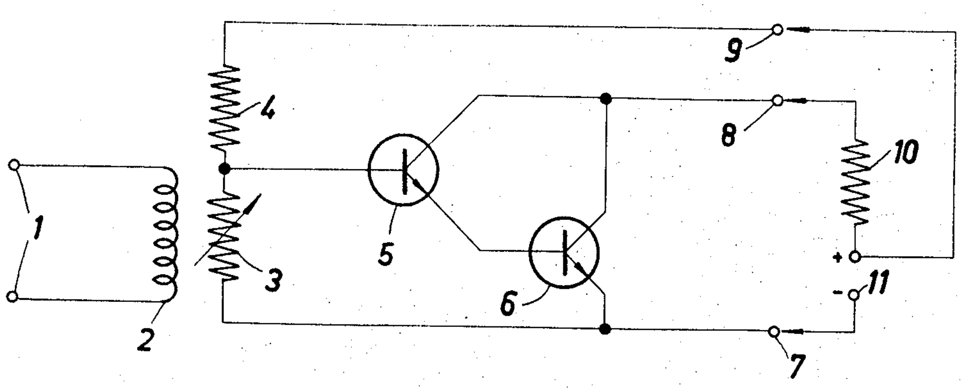
FIG. 1 is a schematic diagram of the contactless relay according to the present invention.

The operation of the contactless relay according to the present invention proceeds as follows:

When a control voltage arises at the connections or terminals 1, a magnetic field is built up in the relay coil 2 and as a result, the resistance value of the magnetic field-dependent resistance 3 changes positively. Consequently, also the current flow through the resistance 4 and the resistance 3 will change, whereby the working or bias point of the transistor 5 is shifted. This shift has the effect that the transistor 6 becomes conducting and therewith that the "contact" is closed. When the voltage at the connections 1 drops, the field in the coil is collapsed and the resistance 3 will obtain its original value once again, whereby the transistor 6 is switched via the transistor 5 into a non-conducting condition. The relay proposed by the present invention has the particular advantage that due to the absence of mechanical contacts very high switching frequencies of up to 15 kilocycles per second and above are possible. Such a high switching frequency cannot be obtained with a relay having mechanical contacts.

Figure 2:
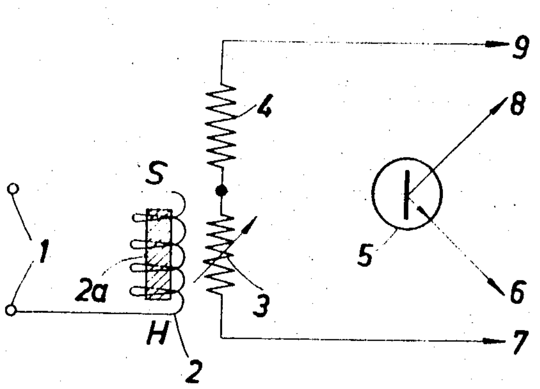
FIG. 2 illustrates a slightly modified embodiment of the contactless relay according to the present invention.
Figure 3:
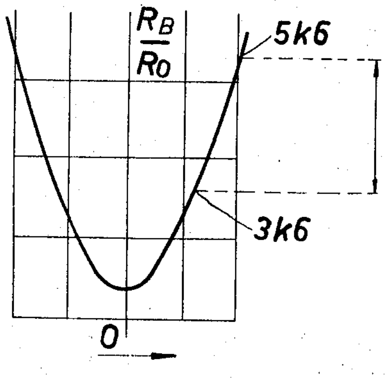
FIG. 3 is a graphic illustration of the characteristic curve of the circuit arrangement according to FIG. 2.

FIG. 2 illustrates a part of the practically identical circuit arrangement of FIG. 1 with the difference that a permanent magnet 2*a* is employed as coil core of the relay coil 2. As is apparent from the graphic illustration of FIG. 3, this produces a premagnetization of the magnetic field-dependent resistance 3 with, for example, 3 kGauss.

By virtue of the coil excitation, an additional strengthening or amplification of the field of 2 kGauss is achieved and has been plotted on the abscissa. The difference of the resistance value is apparent from the two ordinates. As is further evident from the graphic illustration, the premagnetization renders it possible to adjust at will the mutual conductance of the entire relay within the given limits. It is understood that the provision may be made in the reverse order by starting with or departing from a strong premagnetization and bringing about a field weakening by means of the superimposed field. Again in this case, the switching operation of the relay may be released or started by a suitable dimensioning of the switching elements.

Figure 4:
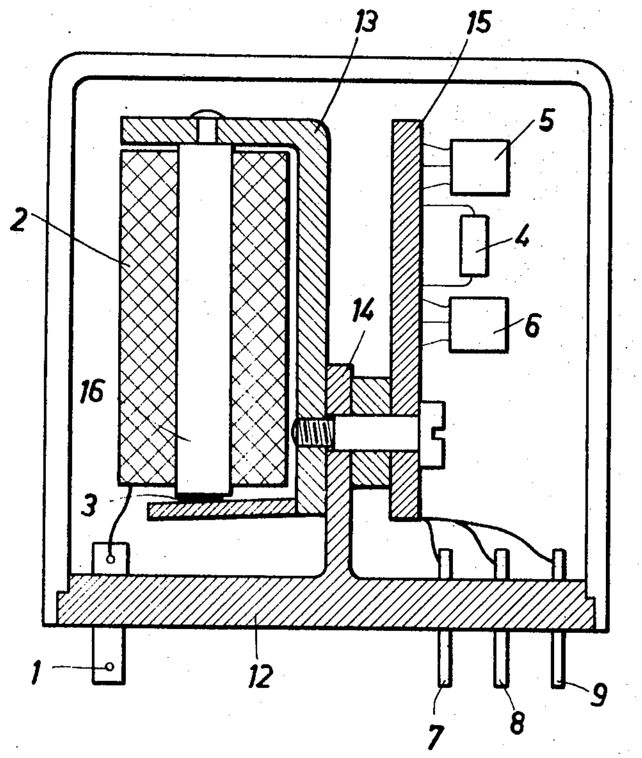
FIG. 4 illustrates in principle an embodiment of the contactless relay according to the present invention viewed in cross section.

FIGS. 4 and 14 shows how the relay may be constructed in actual practice. The coil 2 is secured to a conventional base plate 12 by means of a yoke 13. The connections or terminals 1 extend through the plate 12 and project downwardly from the plate 12. A printed circuit board 15 carrying the transistors 5 and 6 as well as the series resistance 4 is secured to a central web or bridge 14. The magnetic field-dependent resistance 3 which is connected to the other structural elements of the circuit is disposed in the air gap between the yoke 13 and the core 16. The connections 7, 8, and 9 may likewise be guided outwardly through the plate 12. The relay is expediently so arranged that, instead of a normal relay, it can be inserted or plugged into known plug-socket holders.

Obviously it is quite possible to utilize instead of the magnetic field-dependent resistance a different device being controllable by means of the magnetic field, such as, for example, a Hall generator or the like. Additionally it is conceivable to provide the magnetic field-dependent resistance and/or the entire electronic circuit arrangement as integrated circuit. A further reduction in size of the relay could be effectively achieved thereby.

It is further possible to employ instead of the transistor arrangement also diodes and diacs, thyristors and triacs, particularly when it is a question of switching greater current intensities. Lastly, one or several electromagnetic control circuits can actuate also several electronic switching circuits.

In FIG. 5, reference numeral 1 designates the connections for a relay coil 2. In the arrangement illustrated, the magnetic core 16 is so disposed with respect to the U-shaped yoke 13 that one air gap each is produced at the upper and at the lower end. Two magnetic field-dependent resistances 3 each are provided in this air gap. These resistances may be connected with a circuit arrangement such as has been described hereinabove.

FIGS. 6 to 8 illustrate in principle the multiple switching arrangement of a contactless relay. An elongated ferromagnetic core 18 which is enclosed by an elongated coil 19 is disposed within a U-shaped elongated ferromagnetic yoke ledge 17. The ferromagnetic core 18 includes at the upper and at the lower side several transversely-extending trapezoidal slots or grooves 20 so that salient pole pieces 21 are formed. The arrangement is so made that between the two legs of the U-shaped profile piece 17 one air gap each is formed above and below in which the magnetic field-dependent resistances 3 are accommodated. The entire device is secured to an angular member 22 to which is attached also the plate 23 for the printed circuit. The transistors 5 and 6 as well as the remaining switching elements are accommodated on the plate 23. The individual connections for the relay coil for the current supply as well as for the circuit or network are connected with a plug board 24 provided in a printed circuit and mounted on the latter are the individual conductor tracks of the plug.

Figure 9:
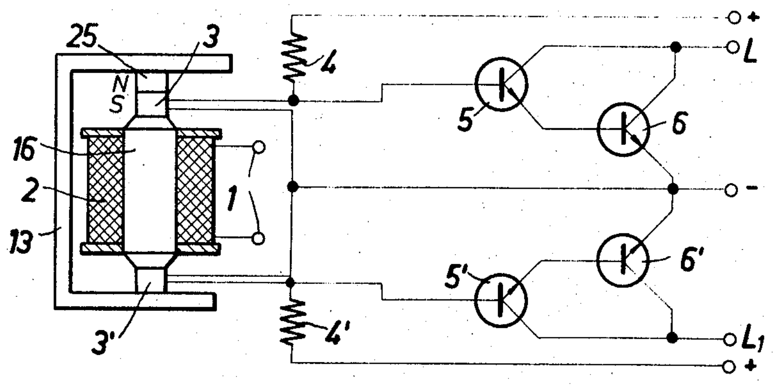
FIG. 9 illustrates a simple circuit arrangement for a contactless change-over or switching relay.

FIG. 9 illustrates a circuit arrangement for a contactless relay which acts as change-over or switching relay. In the example illustrated, the electromagnetic control circuit consists again of the relay coil 2 being provided with connections 1 and comprising a core 16 which is so arranged that it forms with the U-shaped yoke 13 one air gap each at the upper and at the lower end. A magnetic field-dependent resistance 3 together with a permanent magnet 25 being magnetized in the axial direction is disposed in the upper air gap. A further magnetic field-dependent resistance 3′ is disposed in the lower air gap. The upper magnetic field-dependent resistance 3 is switched via a series resistance 4 to the positive potential, and the lower magnetic field-dependent resistance 3′ is likewise switched to the positive potential via a resistance 4′. The other ends of the two magnetic field-dependent resistances are interconnected and extend to the negative pole. The connecting points between the magnetic field-dependent resistances 3, and 3′ and the series resistances 4, and 4′ are connected in each case with the base of two transistors 5 and 5′, respectively. The emitters of these transistors are connected with the base of two switching transistors 6 and 6′, respectively. The collector of the transistor 6 is connected with the collector of the transistor 5 and with the connection or terminal L for the current source and the load impedance. Analogously, the collector of the transistor 6′ together with the collector of the transistor 5′ is connected to the connection L1 for the load impedance. The current source is located between the positive pole and the negative pole and the load impedance above L and L1.

The operation of the circuit is as follows.

The working point of the magnetic field-dependent resistance 3 is so adjusted by means of the permanent magnet 25 that in the currentless condition of the relay coil 2 the transistor arrangement 5, 6 is switched on and/or off. Hence the working point of the magnetic field-dependent resistance 3′ is switched off and/or on in this condition. When the magnetic coil 2 is excited, the working point of the magnetic field-dependent resistance 3 is switched in such a manner that an inverse switching operation takes place in the switching transistor 6. The magnetic field-dependent resistance 3' then switches the switching transistor 6' in the inverse switching direction.

The arrangement may also be so made that, by changing the potential load at the connections 1, a magnetic field in the opposite direction is produced, whereby inverse switching operations will be produced in the switching transistors 6 and 6', respectively. The load impedance connected at the points L and L1 is then switched alternately in one direction or in the other direction, depending upon the switching condition of the transistor 6 and 6', respectively.

Instead of the elongated core 18 and the elongated coil 19 in the embodiment according to FIGS. 6 to 8, it is possible of course to dispose several individual round coils with round cores next to each other. Individual relay coil arrangements may be provided as simple switches, multiple switches, and as change-over switches, for example according to FIG. 9. Finally, according to FIG. 1, two or several magnetic field-dependent resistances may be accommodated in one air gap, as far as such is possible, in order to obtain further switching possibilities in this manner.

Finally it is possible to connect the magnetic field-dependent resistances with the switching elements of the switching transistor arrangement in the form of integrated circuits. These may be made, for example, in the thick-film or thin-film technique according to the evaporating methods known in the art.

Figure 10:
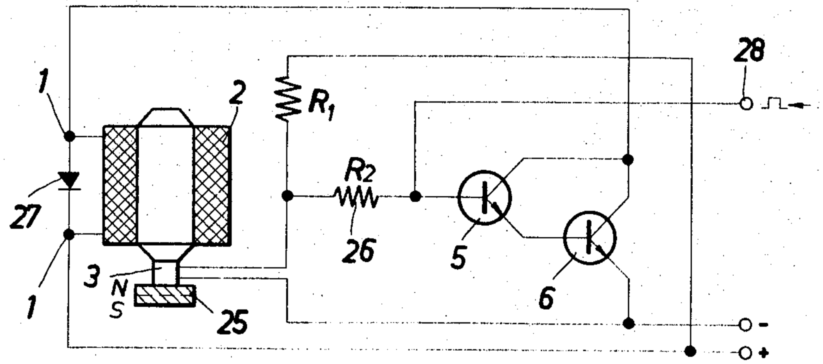
FIG. 10 illustrates a further circuit arrangement of the relay.

FIG. 10 illustrates a further circuit arrangement of the relay according to the present invention in which the circuit is provided as self-holding circuit. The field plate 3 is in this case so excited by the permanent magnet 25 that the transistor amplifier arrangement 5, and 6 is open. A further resistance 26 is switched or connected at the connecting point between the magnetic field-dependent resistance 3 and the series resistance 4. The collector output of the transistor arrangement 5, and 6 is connected with one input 1 of the exciting coil 2. The exciting coil 2 is bridged with a rectifier 27. When a switching pulse now arrives at the supply or feeder line 28, it connects the amplifier arrangement 5, and 6 through, and the coil 2 is excited. As a result, the control resistance of the magnetic field-dependent resistance is reduced by the weakening of the permanent magnetic field to such an extent that the amplifier arrangement 5, and 6 remains connected through. Only by means of a pulse having opposite polarity, or by temporarily switching off the load voltage will the relay be deenergized.

It is understood that the circuit arrangement may also be provided without permanent magnet in such a manner that the same effect is achieved, whereby the relay in the condition of rest thereof is connected through and is switched off only by means of a control pulse, then remaining in this condition. This provision may be employed particularly for safety devices and for control devices, respectively.

Figure 11:
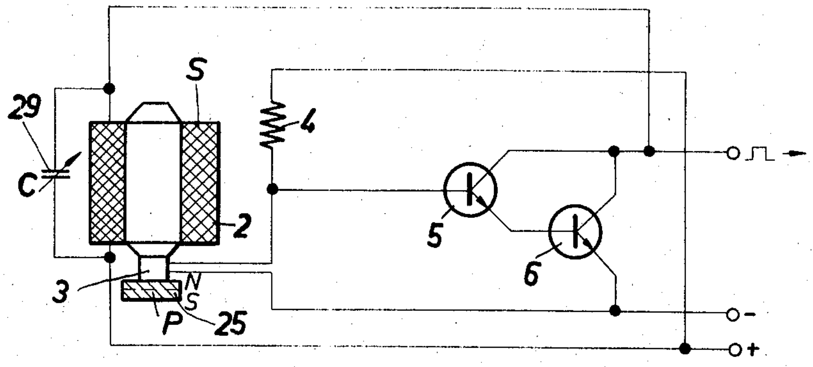
FIG. 11 illustrates still another circuit arrangement of the relay according to the present invention.

FIG. 11 illustrates a further switching arrangement which is provided as self-holding circuit. In this circuit arrangement, a capacitor 29 is connected in parallel with respect to the relay coil 2 so that the coil and the capacitor constitute an oscillating circuit. This capacitor is variable in the value thereof so that the oscillating frequency of the circuit may be varied within specific limits which are determined or defined by the inductance of the coil. The capacitor 29 may, for example, be a trimming capacitor or a rotating plate capacitor. In a special switching or circuit arrangement, a capacitance diode may also be utilized instead of the capacitor. By virtue of the arrangement of the permanent magnet 25 and omission of the capacitor 29, with feedback of the output to the input, an oscillating frequency may equally be produced which must be fixed by means of suitable switching means. Also, a defined starting position of the pulse train or repetition may be obtained thereby.

As is further apparent from the figures, the core 16 within the range of the field plate 3 is so contracted in the cross section thereof that the maximal field intensity is achieved with the smallest induction of the coil. This effect should be sought because the dimensioning of the coil influences the maximal switching frequency. By virtue of the circuit arrangement as shown, a generator is thus provided which supplies a very specific adjustable frequency, and specific pulses, pulse trains and pulse shapes may also be produced by reason of the particular construction of the switching means, which is known per se.

Since the temperature coefficient of the heretofore known magnetic field-dependent resistances is very high and since also a relatively high resistance variation will arise per degree of temperature variation, it may happen that the transistor amplifier 5, and 6 is switched on or off at a specific temperature. It is therefore expedient to adjust and, respectively, to regulate the switching point by changing the bias voltage of the magnetic field-dependent resistance. This may be accomplished in a simple manner by providing the series resistance 4 as either a regulable resistance or as potentiometer.

Figure 12:
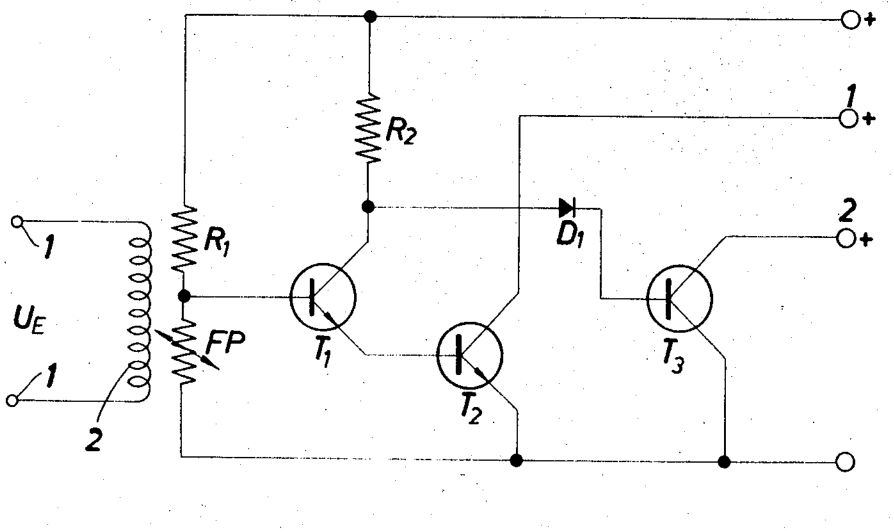
FIG. 12 illustrates a circuit arrangement for a change-over or switching relay without permanent magnet.
Figure 13:
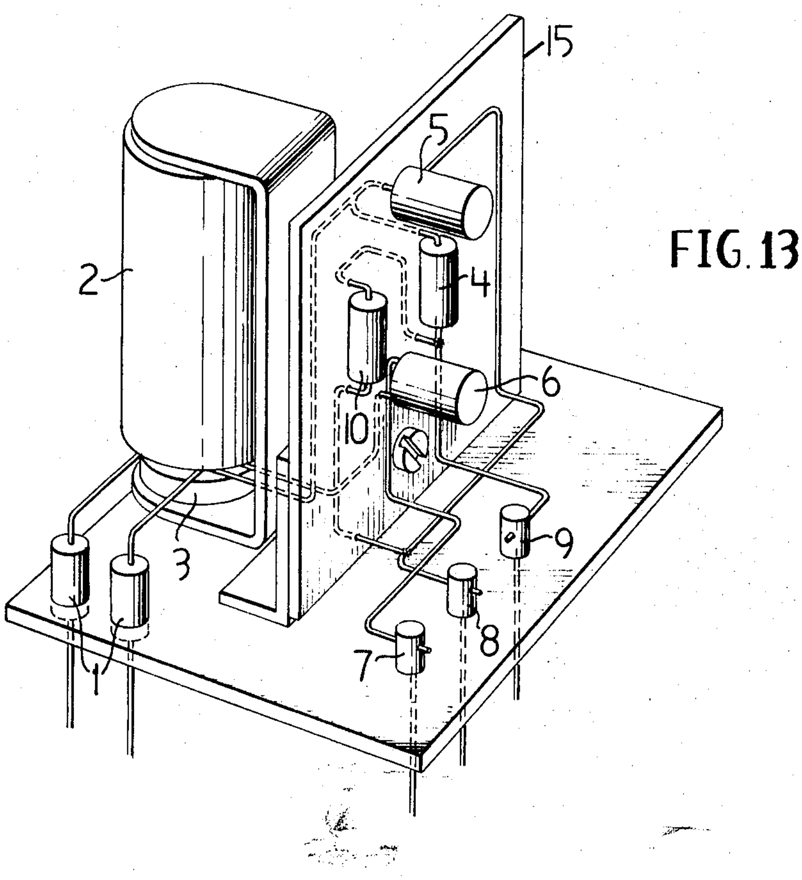
FIG. 13 is a perspective view of the embodiment shown in FIGS. 1 and 4. DESCRIPTION OF THE PREFERRED EMBODIMENTS In FIG. 1, reference numeral 1 is used to identify the connections for relay coil 2. Disposed within the magnetic field range of the relay coil 2 is a magnetic field-dependent resistance 3 which is connected in series with a series or additional resistance 4. The connecting point or junction between the magnetic field-dependent resistance 3 and the series resistance 4 is connected to the base of an amplifying transistor 5. The emitter of the transistor 5 is connected with the base of a switching transistor 6 whose collector is connected or wired to the contact or terminal 8 for the current source 11 and the load impedance 10, and whose emitter is connected or wired, together with the magnetic field-dependent resistance 3, to the contact or terminal 7 for the current source 11. Moreover the current source 11 is in operative engagement, by way of the contact or terminal 9, with the series resistance 4, whereby the fixed voltage for the field probe is supplied.

FIG. 12 discloses a further circuit arrangement for a change-over or switching relay according to the present invention for which a permanent magnet is not required.

In this figure, reference numeral 1 designates again the connections for a relay coil 2 to which is applied the control voltage $U_E$ in the switching. Disposed in magnetic field range of the relay coil 2 is a magnetic field-dependent resistance $F_P$ which is connected in series with a series or additional resistance R 1 and is positioned at the voltage source. This magnetic field-dependent resistance $F_P$ changes its resistance value in depedence upon the magnetic excitation by means of the coil. The connecting point between the magnetic field-dependent resistance $F_P$ and the series resistance R 1 is connected with the base of an amplifier transistor T 1. The emitter of the transistor T 1 is connected with the base of a switching transistor T 2 whose collector is connected with the connection or terminal for the first load. The positive pole of the voltage source is further in operative engagement with the collector of the transistor T 1 via the series resistance R 2.

The collector of T 1 is connected via a diode D 1 with the base of a further switching transistor T 3. The collector of T 3 is in operative engagement with the connection or terminal for the second load. The operation of the contactless relay according to the present invention is therein as follows:

When a control voltage $U_E$ occurs at the connections 1, a magnetic field is built up in the relay coil 2, whereby the resistance value of the magnetic field-dependent resistance $F_P$ changes positively. As a result, also the current flow via the resistance R 1 and the resistance $F_p$ will be changed, whereby the working point of the transistor T 1 is shifted. This shift has the effect that the transistor T 2 becomes conductive and the "contact" is thus closed. The diode D 1 blocks at that time the voltage with regard to the base of T 3 so that the "contact" of T 3 is open.

When the voltage at the connections 1 decreases, the field in the coil is collapsed and the resistance $F_p$ again obtains its original value. As a result thereof, the transistor T 2 is passed into a non-conducting condition via the transistor T 1. Due to the current variation, however, a switching pulse is supplied or imparted, via the diode, to the transistor T 3 so that the latter is in a conducting condition, this "contact" thus being closed. The connection for the load 2 is thus closed whereas the connection for the load 1 is open. When now a control voltage is again supplied to the coil, the connection for the load 2 is opened and the connection for the load 1 will be closed.

The relay according to the present invention has the particular advantage that a change-over may be carried out with but a single magnetic field-dependent resistance and without the use of permanent magnets.

Various modifications are contemplated and may be obviously resorted to by those skilled in the art without departing from the spirit and scope of the invention as hereinafter defined by the appended claims, as only preferred embodiments thereof have been disclosed.

What is claimed is:

1. In a switching arrangement for a relay having no mechanical contact element, comprising an electromagnetic control circuit with an electromagnetic coil having a magnetic field in which a magnetic field-dependent resistance is disposed, and an electronic switching circuit, the improvement wherein the magnetic field-dependent resistance is connected in series with an additional resistance to form a junction which is connected to the base of a first transistor, the emitter of the first transistor being connected with the base of a second switching transistor, the collector of which is connected to a terminal at one end of a load impedance and to the collector of the first transistor, wherein one pole of a voltage source is is connected to the emitter of said second switching transistor and to the end of the magnetic field-dependent resistance remote from the junction, for operation as a switching relay, and wherein first and second air gaps being disposed between a core of said electromagnetic coil and a U-shaped ferromagnetic yoke respectively at first and second connecting ends thereof, and comprising first and second such magnetic field-dependent resistances, said first resistance being disposed in said first air gap, and said second magnetic field-dependent resistance together with a permanent magnet being disposed in said second air gap, and said first and second magnetic field-dependent resistances being in operative engagement with respective such switching transistor arrangements.

2. In a switching arrangement for a relay having no mechanical contact element, comprising an electromagnetic control circuit with an electromagnetic coil having a magnetic field in which a magnetic field-dependent resistance is disposed, and an electronic switching circuit, the improvement wherein the magnetic field-dependent resistance is connected in series with an additional resistance to form a junction which is connected to the base of a first transistor, the emitter of the first transistor being connected with the base of a second switching transistor, the collector of which is connected to a terminal at one end of a load impedance and to the collector of the first transistor, wherein one pole of a voltage source is is connected to the emitter of said second switching transistor and to the end of the magnetic field-dependent resistance remote from the junction, and further comprising a flat elongated core said coil being elongated and having said core disposed therein, said core comprising at its upper and lower sides symmetrically-positioned recesses forming pole pieces, the entire coil-and-core arrangement being enclosed with a U-shaped ferromagnetic profile bar forming an upper and a lower air gap, and wherein at least one of several magnetic field-dependent resistances respectively is disposed in each individual air gap at said pole pieces.

3. A switching arrangement according to claim 2, characterized in that several individual relay coils having ferromagnetic cores are disposed in said U-shaped ferromagnetic profile bar, two air gaps each being thus formed within which latter at least one of several magnetic field-dependent resistances is accommodated.

4. In a switching arrangement for a relay having no mechanical contact element, comprising an electromagnetic control circuit with an electromagnetic coil having a magnetic field in which a magnetic field-dependent resistance is disposed, and an electronic switching circuit, the improvement wherein the magnetic field-dependent resistance is connected in series with an additional resistance to form a junction which is connected to the base of a first transistor, the emitter of the first transistor being connected with the base of a second switching transistor, the collector of which is connected to a terminal at one end of a load impedance and to the collector of the first transistor, wherein one pole of a voltage source is is connected to the emitter of said second switching transistor and to the end of the magnetic field-dependent resistance remote from the junction, arranged as a self-holding relay wherein, said relay coil is connected to the collectors of the transistors and to the other pole of the voltage source, said coil being bridged by a rectifier, and a pulse line being connected to the base of said first transistor and being connected via a resistance to said magnetic field-dependent resistance.

5. A switching arrangement according to claim 4, characterized in that by virtue of the connection in parallel of a capacitor said coil constitutes an oscillating circuit serving as generator, the frequency for varying said capacitor being variable.

6. In a switching arrangement for a relay having no mechanical contact element, comprising an electromagnetic control circuit with an electromagnetic coil having a magnetic field in which a magnetic field-dependent resistance is disposed, and an electronic switching circuit, the improvement wherein the magnetic field-dependent resistance is connected in series with an additional resistance to form a junction which is connected to the base of a first transistor, the emitter of the first transistor being connected with the base of a second switching transistor, the collector of which is connected to a terminal at one end of a load impedance and to the collector of the first transistor, wherein one pole of a voltage source is is connected to the emitter of said second switching transistor and to the end of the magnetic field-dependent resistance remote from the junction, for operation to selectively apply an output to one of two loads, wherein the output of said second switching transistor is connected to a first load, and wherein the collector of said first transistor is connected by way of a diode with the base of a further switching transistor whose output is connected to the second load.

* * * * *